March 14, 1933. L. C. JONES Re. 18,766
PROCESS FOR PURIFYING THE NITROGEN-HYDROGEN MIXTURE IN THE SYNTHESIS OF AMMONIA
Original Filed April 2, 1927
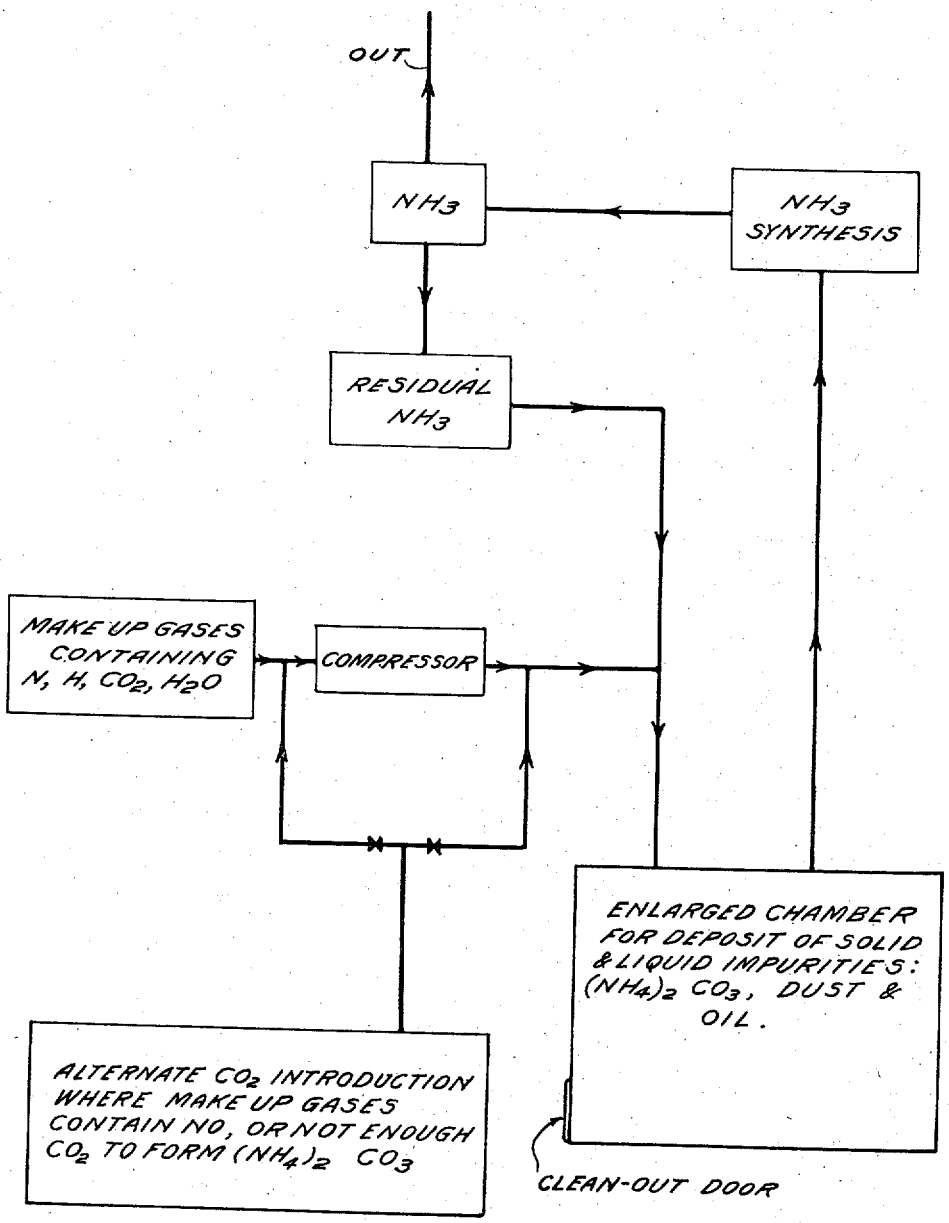
INVENTOR.
LOUIS CLEVELAND JONES,
BY
ATTORNEY.

Reissued Mar. 14, 1933 Re. 18,766

UNITED STATES PATENT OFFICE

LOUIS C. JONES, OF GREENWICH, CONNECTICUT, ASSIGNOR TO CHEMICAL ENGINEERING CORPORATION, OF NEW YORK, N. Y., A CORPORATION OF DELAWARE

PROCESS FOR PURIFYING THE NITROGEN-HYDROGEN MIXTURE IN THE SYNTHESIS OF AMMONIA

Original No. 1,794,903, dated March 3, 1931, Serial No. 180,617, filed April 2, 1927. Application for reissue filed May 17, 1932. Serial No. 611,929.

My invention relates generally to the synthetic manufacture of ammonia from its elements and is particularly adapted to improved processes for purifying the gaseous mixture of hydrogen and nitrogen in the manufacture of anhydrous ammonia.

After compressing mixtures of nitrogen and hydrogen in combining proportions in the process of making synthetic ammonia, the gas mixture still contains, in addition to other impurities, certain amounts of moisture in equilibrium at the pressure and temperature involved. This moisture acts injuriously upon the ammonia catalyst and when anhydrous ammonia is produced causes contamination of product.

At pressures above 100 atmospheres, the amount of this moisture is necessarily small, but it is considered important to remove it which has been done by refrigeration, washing with liquid anhydrous ammonia, or by other means.

The make-up gas mixture is usually freed as far as possible from carbon dioxide by washing in caustic soda or otherwise since this, too, is an injurious impurity.

In industrial practice, therefore, it is extremely advantageous in securing satisfactory yields to remove, if possible, even the last traces of these harmful impurities from the nitrogen-hydrogen mixture before treating same catalytically.

I have found that both these impurities and also others, such as oil particles and dust, can be effectively removed in the solid form by introducing into the make-up gas current predetermined amounts of carbon dioxide which will react with the ammonia present to produce solid ammonium carbonate. In this way, both the carbon dioxide and moisture also are removed from the gas current according to the following reaction:

$$2NH_3+CO_2+H_2O=(NH_4)_2CO_3$$

The amount of moisture concerned in this reaction is necessarily small, since gas at 100 atmospheres pressure, saturated with water vapor at 20° C., contains (by volume) only about 1 part of moisture to 30,000 parts of gas. Therefore, the same amount of carbon dioxide is required to remove this water with the formation of ammonium carbonate.

Ordinarily, unless this carbon dioxide is completely removed, the solid ammonium carbonate formed will ultimately cause difficulty by stoppage in the system of piping.

However in my process, an enlargement in the circulating system causing interruption of the gas current and containing surface-giving material may be advantageously utilized to provide for the solid materials deposited.

In actual practice, I have found that the deposition of this solid matter brings down with it any other solid or liquid impurities present in the gas current such as particles of oil and dust, all of which are thereafter removed.

My improved process is carried out in practice by bringing the carbon dioxide containing gas into the circulating system containing the gas mixture for use in the synthesis of ammonia immediately preceding or directly into an enlargement in the circulation system after compression but before catalysis. This enlargement may consist of any suitable chamber filled with Raschig rings or similar baffling or filtering material which will cause the deposit of the solid or liquid impurities without stoppage of the gas current which is thereby freed from such injurious substances. Two such enlargements arranged in parallel will advantageously permit convenient cleaning of one while the other remains in operation.

The essential features of my process, therefore, involve the introduction of small but controlled amounts of carbon dioxide into the gases under pressure in order to produce a solid compound containing moisture which compound also removes the carbon dioxide introduced as well as other solid and liquid impurities such as oil and dust particles, such impurities in solid form being removed from the gases in circulation before production of ammonia. The amount of carbon dioxide should not exceed one-half by volume the ammonia in the gases in circulation.

The single figure in the drawing represents diagrammatically a layout of the various elements of the apparatus used in carrying out the process.

In this figure the make-up gases indicated at 1 and including nitrogen, hydrogen, carbon dioxide and water vapor pass to the compressor 2 where they are put under suitable pressure. After compression the residual ammonia 3 remaining in the catalyst gases after the ammonia removal 4 is introduced into the line, and this admixture of gases then goes to the enlarged chamber 5. In this enlarged chamber the residual ammonia, the carbon dioxide and the water combine to form solid ammonium carbonate which is precipitated as such therein. This precipitation carries with it any oil, dust, or the like which may occur in the gases at this point and the solid and liquid impurities thus removed may be removed from the chamber in any suitable manner. From the chamber 5 the gases pass to the ammonia catalyst apparatus 6 where the conversion of the nitrogen and hydrogen into ammonia takes place. The major portion of the resultant ammonia is removed as at 4, the residual ammonia 3 going back into the cycle as indicated.

As an alternative method, where the original make-up gases either contain no or only deficient quantities of carbon dioxide which are not enough to combine with the carbon dioxide and water to form ammonium carbonate, additional quantities of carbon dioxide 7 may be introduced either before or after compression as indicated. In this way there are always sufficient quantities of the necessary ingredients or impurities to cause a combination thereof and precipitation as ammonium carbonate with effective removal of these impurities.

I claim:

1. In a process of synthetically producing ammonia, in which a mixture of hydrogen and nitrogen is passed over a catalyst and a portion of the ammonia is removed by condensation or the like, the improvement which comprises admixing the circulating gas containing residual ammonia with the "make-up" gas containing carbon dioxide in a region of reduced velocity and depositing solid ammonium carbonate formed by the resulting reaction in said region.

2. In a process of synthetically producing ammonia, in which a mixture of hydrogen and nitrogen is passed over a catalyst and a portion of the ammonia is removed by condensation or the like, the improvement which comprises contacting the circulating gas containing residual ammonia with the "make-up" gas containing carbon dioxide in a region of reduced velocity and baffled flow and depositing solid ammonium carbonate formed by the resulting reaction in said region.

3. In the synthesis of ammonia by circulation of a gas mixture including hydrogen and nitrogen cyclically over a catalyst, then through an ammonia separator, then over the catalyst and so on, the improvement which comprises supplying make-up gases contaminated with carbon dioxide to the circulating gas mixture leaving the ammonia separator, and separating ammonium carbonate formed from the resulting gas mixture as a solid before the remaining gas mixture is passed over the catalyst.

4. In a process of synthetically producing ammonia by cyclically circulating a mixture of hydrogen and nitrogen over a catalyst and removing a portion of the ammonia formed thereby by condensation or the like, the improvement in purifying the mixture which comprises contacting the circulating mixture containing residual ammonia with make-up gases containing impurities, reacting impurities of the make-up gases with the residual ammonia in vapor phase to form solid compounds in a region of reduced velocity and baffled flow, and separating the solid compounds before the circulating gas mixture is passed over the catalyst and before the removal of ammonia resulting from catalysis.

In testimony whereof, I have hereunto subscribed my name this 11th day of May, 1932.

LOUIS C. JONES.